United States Patent
Gerber et al.

(10) Patent No.: US 6,503,143 B2
(45) Date of Patent: Jan. 7, 2003

(54) AGRICULTURAL BEATER HAVING REPLACEABLE BLADES

(75) Inventors: Merle Ray Gerber, Moline, IL (US); Craig Allen Wiegel, Bettendorf, IA (US); Daniel Jeffrey Selle, Orion, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/770,695

(22) Filed: Jan. 26, 2001

(65) Prior Publication Data

US 2002/0103015 A1 Aug. 1, 2002

(51) Int. Cl.⁷ ................................................ A01F 12/18
(52) U.S. Cl. ......................................... 460/113; 460/73
(58) Field of Search ........................... 460/73, 112, 113, 460/70, 74; 56/503, 504, 505; 492/30, 38; 241/191, 192, 195, 197

(56) References Cited

U.S. PATENT DOCUMENTS

| | | | | |
|---|---|---|---|---|
| 9,635 A | * | 5/1853 | Beamont | 460/71 |
| 779,939 A | * | 1/1905 | Hovey | 460/113 |
| 1,574,436 A | * | 2/1926 | Martin | 241/191 |
| 1,575,452 A | * | 3/1926 | Shave | 241/191 |
| 1,760,097 A | * | 5/1930 | Williams | 125/5 |
| 1,802,998 A | * | 4/1931 | Baldwin et al. | 460/113 |
| 2,642,877 A | * | 7/1953 | Dodge et al. | 460/113 |
| 3,630,209 A | | 12/1971 | Metzger et al. | 130/27 F |
| 4,657,029 A | | 4/1987 | Helm et al. | 130/27 JT |
| 5,112,279 A | | 5/1992 | Jensen et al. | 460/69 |
| 5,676,598 A | | 10/1997 | Ackley et al. | 460/73 |

FOREIGN PATENT DOCUMENTS

| | | |
|---|---|---|
| DE | 195 06 060 A1 | 8/1996 |
| FR | 2 146 060 | 2/1973 |
| FR | 2 354 698 | 4/1978 |
| WO | 90/08458 | 8/1990 |
| WO | WO 93/20942 A1 * | 10/1993 |

OTHER PUBLICATIONS

John Deere 50 Series Combines brochure entitled "All–New 50 Series Combines" front and back pages, and page 18, DKA112, printed in the U.S.A., 1999.
John Deere Fundamentals of Machine Operation manual entitled "Combine Harvesting", front and back pages, inside cover and pp. 42–43, FMO–15102B, printed in the U.S.A., 1981.

* cited by examiner

*Primary Examiner*—Thomas B. Will
*Assistant Examiner*—Meredith C. Petravick

(57) ABSTRACT

A beater for an agricultural combine comprises an open rotor frame mounted on a drive shaft. The open frame defines a cylindrical periphery to which are mounted transversely extending mounting plates. Adjacent mounting plates define mounting channels. Replaceable crop-engaging blades are mounted in the mounting channels. The mounting plates are provided with a first upturned portion and a second upturned portion. Each replaceable blade is provided with a crop engaging portion and an integral mounting portion. The crop engaging portion of the replaceable blades is provided with first and second mounting lips. The first and second mounting lips respectively engage first and second edges on the first and second upturned portions to prevent rotation of the replaceable blade. The crop engaging portion of the replaceable blade extends outwardly from the mounting channel to engage the crop. Open gaps in the mounting channel are formed between adjacent replaceable blades.

16 Claims, 3 Drawing Sheets

AGRICULTURAL BEATER HAVING REPLACEABLE BLADES

BACKGROUND OF THE INVENTION

1. Field of the Invention

The present invention is directed to a self-cleaning accelerator beater with replaceable blades.

2. Description of the Prior Art

Transverse beaters are used to feed and expel crop material into and from an agricultural combine. They are also used to control the movement of crop material through the threshing and separating process.

In agricultural combines using conventional threshing and separating technology transverse beater maybe located behind the transverse thread concave to slow down material coming off the cylinder and concave and to deflect it downwardly onto the front of the straw walkers. In rotary combines having axially aligned crop processing units, beaters are used to feed crop material into the axially aligned crop processing unit and to expel crop material from the axially aligned crop processing unit.

There are four basic beater types, the wing type, the drum type with removable wings (cover teeth), the drum type with teeth, and the drum type with non-removable wings.

SUMMARY

A beater for an agricultural combine comprises an open rotor frame made up by a plurality of spider frames that are mounted along a drive shaft. The open frame defines a cylindrical periphery to which are mounted transversely extending mounting plates. Adjacent mounting plates define mounting channels. Replaceable crop-engaging blades are mounted in the mounting channels. The mounting plates are provided with a first upturned portion and a second upturned portion. Each replaceable blade is provided with a crop engaging portion and an integral mounting portion. The mounting portion is provided with a mounting hole through which a mounting bolt passes mounting the replaceable blade in the mounting channel. The crop engaging portion of the replaceable blades is provided with first and second mounting lips. The first and second mounting lips respectively engage first and second edges on the first and second upturned portions to prevent rotation of the replaceable blade. The crop engaging portion of the replaceable blade extends outwardly from the mounting channel to engage the crop. The crop-engaging portion is provided with two grooves that define three crop-engaging teeth. Open gaps in the mounting channel are formed between adjacent replaceable blades.

DETAILED DESCRIPTION

Figure 1:
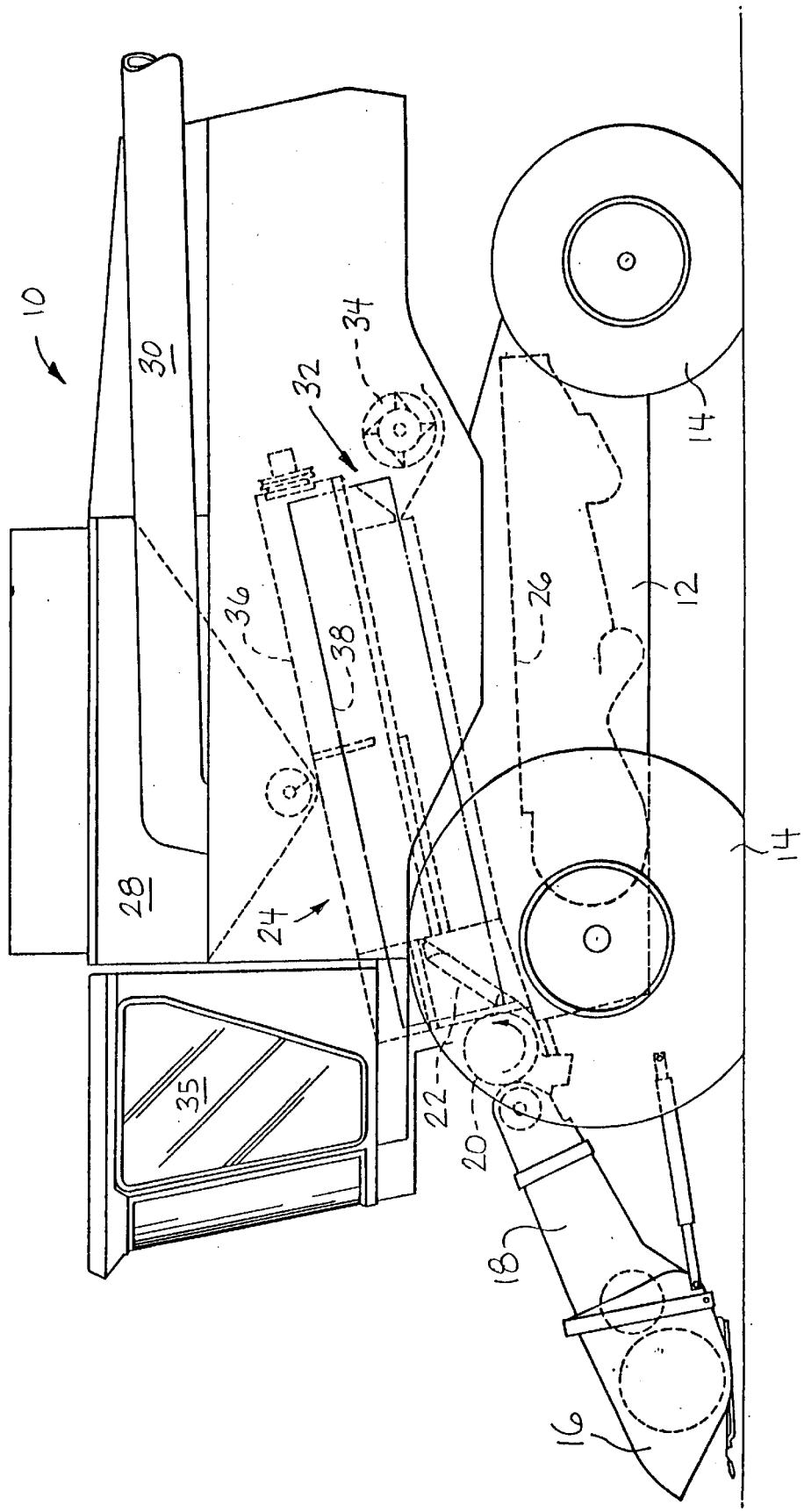
FIG. 1 is a semi-schematic side view of a combine.

FIG. 1 shows an agricultural combine 10 comprising a supporting structure 12 having ground engaging wheels 14 extending from the supporting structure. Although the combine is illustrated as having wheels it could also have ground engaging tracks either full tracks or half tracks. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop-processing unit 24.

The crop-processing unit threshes and separates the harvested crop material. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop-processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from operator's cab 35.

The axial crop-processing unit comprises a cylindrical rotor housing 36 and a rotor 38 located inside the housing 36. The front part of the rotor and the rotor housing define the infeed section of the crop-processing unit 24. Longitudinally downstream from the infeed section are a threshing section, a separating section and a discharge section. The rotor 38 in the infeed section is provided with a conical rotor drum having helical infeed elements for engaging harvested crop material received from the beater 20 and inlet transition section 22. Immediately downstream from the infeed section is the threshing section of the crop-processing unit 24. Threshing section the rotor 38 comprises a cylindrical rotor drum having a number of threshing elements for threshing the harvested crop material received from the infeed section. Downstream from the threshing section is the separating section, wherein the grain trapped in the threshed crop material is released and falls through a floor grate to the cleaning system 28. The separating section merges into a discharge section, where crop material other than grain is expelled from the axial crop-processing unit 24.

The present invention is directed to the configuration of an agricultural beater. The present beater can be used as an infeed beater 20 or as a discharge beater 34. In addition, the present invention should not be limited to combines having axial crop processing units. The present invention can also be used on conventional combines having straw walkers or other types of agricultural combines. The description below will refer to the infeed beater 20 as an example of an agricultural beater.

Figure 2:
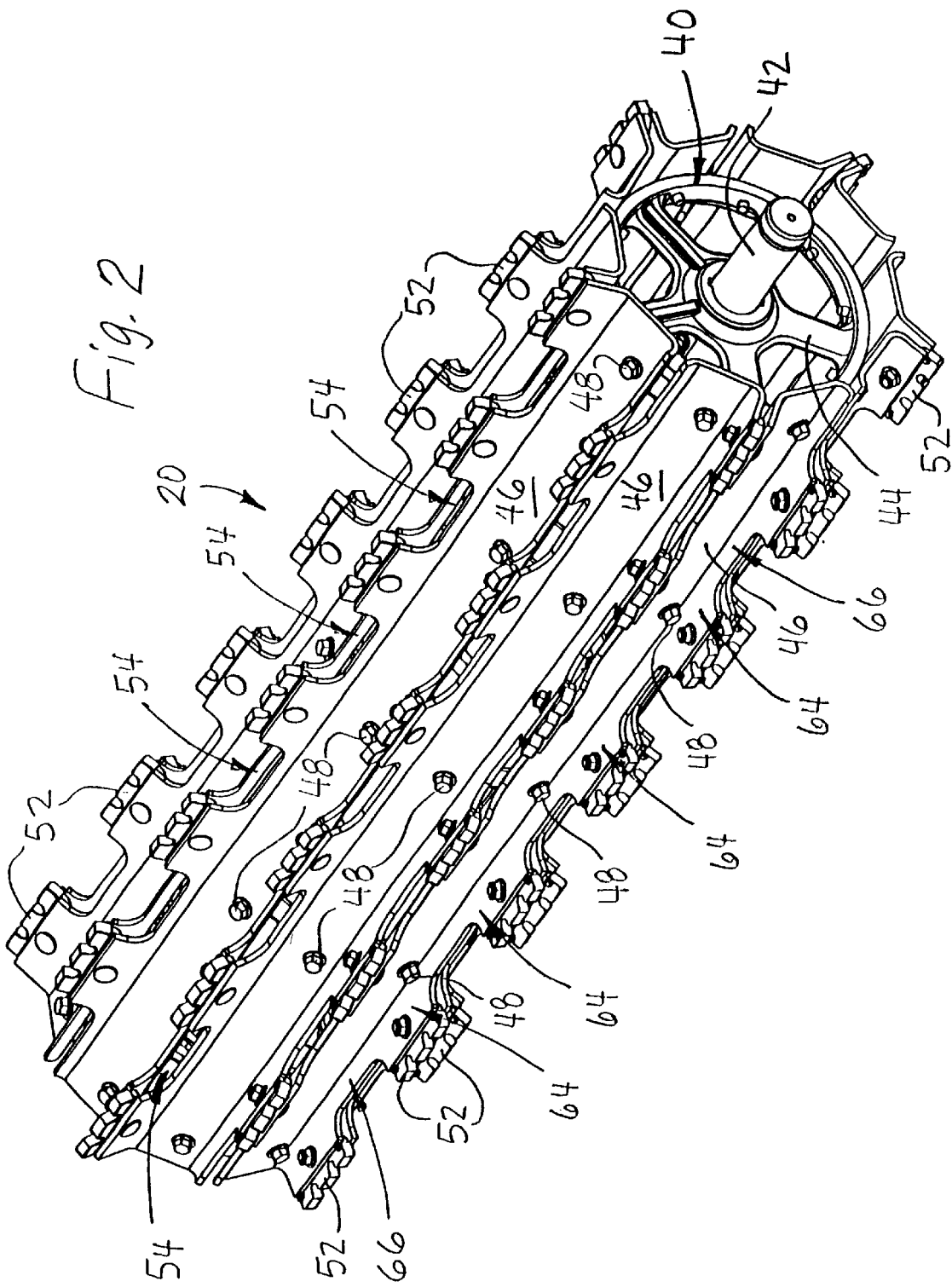
FIG. 2 is a perspective view of an accelerator beater.
Figure 3:
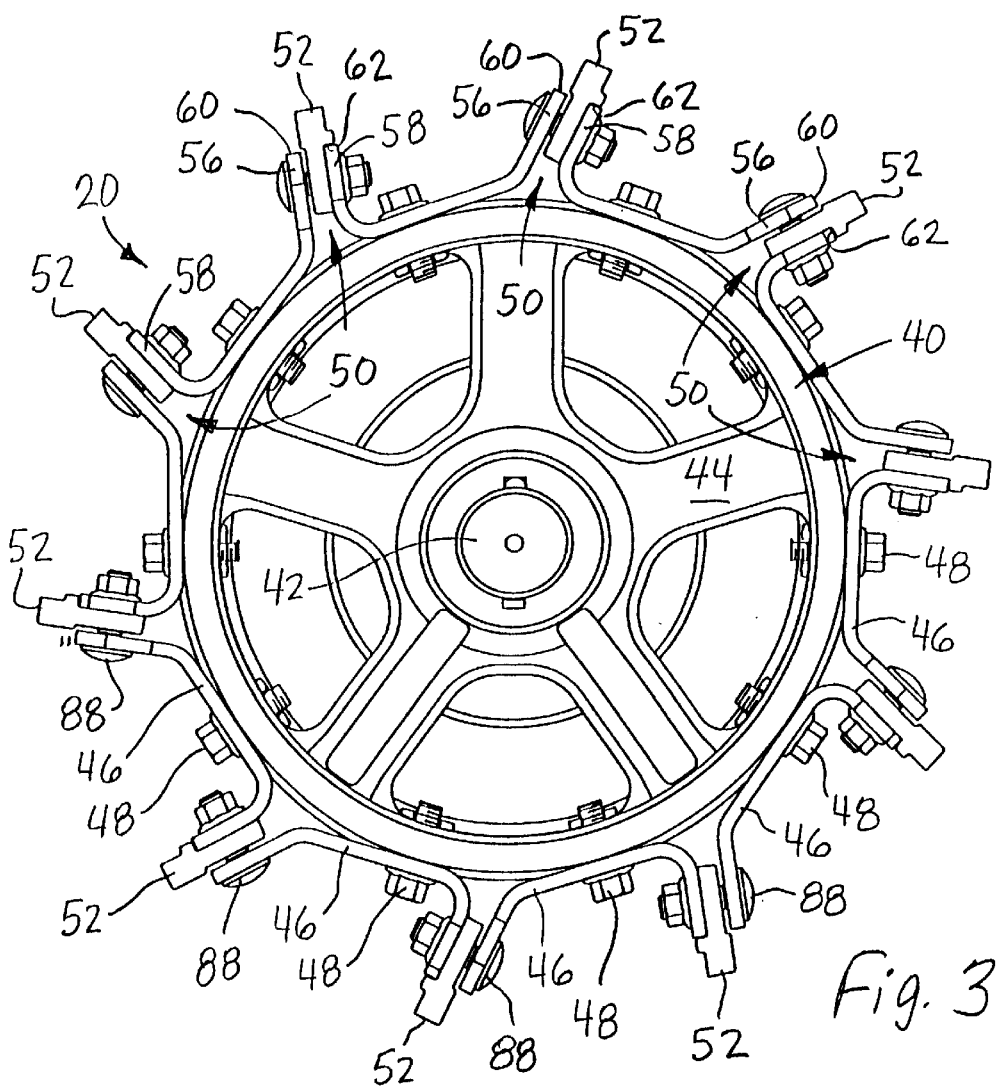
FIG. 3 is a side view of the accelerator beater.
Figure 4:
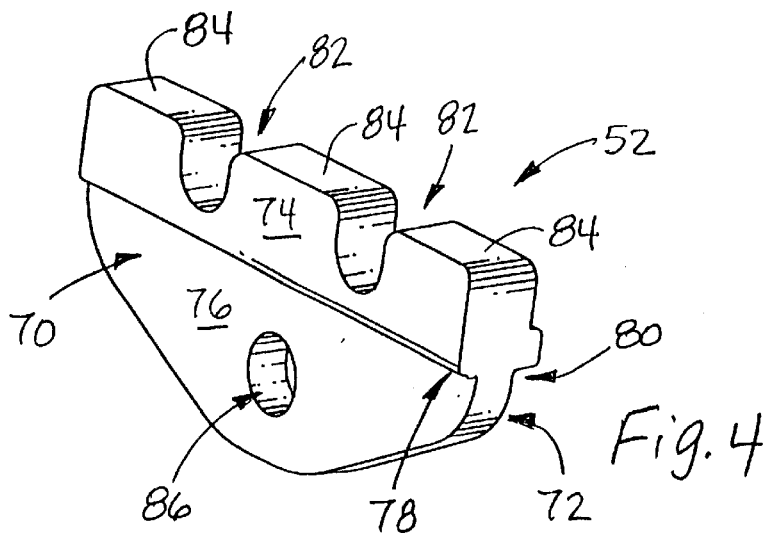
FIG. 4 is a perspective view of one of the replaceable blades.

The structural details of infeed beater 20 are best illustrated in FIGS. 2 and 3. The infeed beater 20 comprises an open frame 40 having at least one drive shaft 42 extending therethrough. The open frame 40 is formed by a plurality of spider frames 44 that are attached to the drive shaft 42 along its length. The exterior of the frame 40 defines a circumferential surface in the form of a cylinder. A plurality of transverse mounting plates 46 are bolted to the spider frames 44 by plate mounting bolts 48. Adjacent mounting plates 46 form a mounting channel 50 in which are mounted a plurality of replaceable blades 52. An open gap 54 is formed between replaceable blades 52 in the mounting channel 50. These open gaps allow crop material to trapped in the rotor frame to be expelled therefrom by centrifugal force.

Each of the mounting plates 46 has a first upturned portion 56 and a second upturned portion 58. The first upturned portion has a first mounting edge 60 and the second upturned portion has a second mounting edge 62. The first upturned portion 56 of a first mounting plate 46 and a second upturned portion 58 of an adjacent second mounting plate 46 form the mounting channel 50. The adjacent upturned portions 56 and 58 sandwich the replaceable blades 52 therebetween. As best illustrated in FIG. 2, the upturned portions have a castellated configuration with raised areas 64 and reduced areas 66. The raised areas 64 define mounting locations for the replaceable blades 52. The reduced areas 66 define the location of the open gaps 54.

The replaceable blades 52 have a first side 70 and a second side 72. Each replaceable blade 52 is divided into a crop engaging portion 74 that extends outwardly form the mounting channel 50 and a mounting portion 76 that is located in the mounting channel 50. The crop engaging portion 74 is provided with a first mounting lip 78 on its first side 70 and a second mounting lip 80 on its second side 72. The mounting lips 78 and 80 bear against the respective first and second mounting edges 60 and 62 to prevent rotation of the replaceable blade 52. The crop-engaging portion is also provided with two grooves 82 defining three crop-engaging teeth 84. The mounting portion 76 of each replaceable blade 52 is provided with a mounting hole 86 through which a mounting bolt 88 passes mounting the blade 52 in the mounting channel 50.

The invention should not be limited by the above-described embodiment, but should be limited solely by the claims that follow.

We claim:

1. A beater for an agricultural combine, the beater comprising:
    an open rotor frame having at least one transversely extending drive shaft for rotating the rotor frame, the rotor frame having a circumferential surface;
    a first transversely extending mounting plate and a second transversely extending mounting plate are circumferentially spaced from one another around the circumferential surface and are directly mounted to the rotor frame, each mounting plate has a first transverse upturned portion and a second transverse upturned portion, the first upturned portion of the first mounting plate and the second upturned portion of the second mounting plate form a mounting channel;
    a first replaceable blade is mounted in the mounting channel, the replaceable blade has a mounting portion and a crop engaging portion, the crop engaging portion extends outwardly from the mounting channel.

2. A beater as defined by claim 1 wherein a second replaceable blade is mounted in the mounting channel so that an open gap is located in the mounting channel between the first and second replaceable blades.

3. A beater as defined by claim 2 wherein the mounting portion of the first replaceable blade is sandwiched between the first upturned portion of the first mounting plate and the second upturned portion of the second mounting plate.

4. A beater as defined by claim 3 wherein the first upturned portion of the first mounting plate is provided with a first edge, the first replaceable blade is further provided with a first lip that bears against the first edge.

5. A beater as defined by claim 4 wherein the second upturned portion of the second mounting plate is provided with a second edge, the first replaceable blade is further provided with a second lip that bears against the second edge.

6. A beater as defined by claim 5 wherein the first and second lip of the first replaceable blade are part of the crop engaging portion.

7. A beater as defined by claim 6 wherein the crop-engaging portion of the first replaceable blade is provided with at least two grooves defining three teeth.

8. A beater as defined by claim 7 wherein the first replaceable blade is bolted to the mounting channel by a mounting bolt passing through the mounting portion.

9. A beater as defined by claim 3 wherein the first and second upturned portions have a castellated configuration with raised areas and reduced areas, the raised areas define replaceable blade mounting locations and the reduced areas define the locations of the open gaps.

10. A beater for an agricultural combine, the beater comprising:
    an open rotor frame having at least one transversely extending drive shaft for rotating the rotor frame, the rotor frame having a periphery;
    a plurality of transversely extending mounting plates are circumferentially spaced around and are directly mounted to the periphery of the rotor frame, each mounting plate is provided with a first upturned portion and a second upturned portion, the first upturned portion is provided with a first edge and the second upturned portion is provided with a second edge, the first upturned portion and the second upturned portion of adjacent mounting plates form mounting channels;
    a plurality of replaceable blades are mounted in the mounting channels, at least one of the mounting channels holds at least two replaceable blades with an open gap being located between the two replaceable blades, each of the replaceable blades has a mounting portion located in the mounting channels sandwiched between the first upturned portion and the second upturned portion of adjacent mounting plates and a crop engaging portion that portion extends outwardly from the mounting channels.

11. A beater as defined by claim 10 wherein the first upturned portions and the second upturned portions have a castellated configuration with raised areas and reduced areas, the raised areas defining replaceable blade mounting locations and the reduced areas defining open gap locations.

12. A beater as defined by claim 11 wherein the first upturned portion of each mounting plate is provided with a first edge, the replaceable blades are further provided with a first lip that bears against the first edge.

13. A beater as defined by claim 12 wherein the second upturned portion of each mounting plate is provided with a second edge, the replaceable blades are further provided with a second lip that bears against the second edge.

14. A beater as defined by claim 13 wherein the first and second lips of the each replaceable blade are part of the crop engaging portion.

15. A beater as defined by claim 14 wherein the crop engaging portion of the each replaceable blade is provided with at least two grooves defining three teeth.

16. A beater as defined by claim 15 wherein the replaceable blades are bolted to the mounting channel by mounting bolts passing through the mounting portion.

* * * * *